(12) United States Patent
Kim et al.

(10) Patent No.: US 11,452,159 B2
(45) Date of Patent: Sep. 20, 2022

(54) ELECTRONIC DEVICE AND CONTROL METHOD THEREOF

(71) Applicant: Samsung Electronics Co., Ltd., Suwon-si (KR)

(72) Inventors: Yijun Kim, Suwon-si (KR); Eunhwa Kang, Suwon-si (KR); Hanbi Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 17/094,153

(22) Filed: Nov. 10, 2020

(65) Prior Publication Data

US 2021/0153283 A1    May 20, 2021

(30) Foreign Application Priority Data

Nov. 18, 2019   (KR) .......................... 10-2019-0147736

(51) Int. Cl.

| | | |
|---|---|---|
| *H04B 7/14* | (2006.01) | |
| *H04W 76/18* | (2018.01) | |
| *G08B 5/22* | (2006.01) | |
| *H04W 4/80* | (2018.01) | |
| *H04W 60/00* | (2009.01) | |

(Continued)

(52) U.S. Cl.
CPC .............. *H04W 76/18* (2018.02); *G08B 5/22* (2013.01); *H04B 7/155* (2013.01); *H04W 4/80* (2018.02); *H04W 60/00* (2013.01); *H04W 84/12* (2013.01)

(58) Field of Classification Search
CPC .. H04B 7/2606; H04B 7/155; H04B 7/15528; H04W 88/04; H04W 16/26; H04W 76/18; H04W 4/80; H04W 60/00; H04W 84/12; H04W 76/19; H04W 88/06; H04W 92/18; H04W 4/50; H04L 2001/0097; G08B 5/22

See application file for complete search history.

(56) References Cited

U.S. PATENT DOCUMENTS 9,930,612 B2    3/2018  Jang et al.
9,942,086 B2 *  4/2018  Xu .................... H04W 36/0058
(Continued)

FOREIGN PATENT DOCUMENTS

KR    10-2015-0073057 A    6/2015
KR       10-1617579 B1     5/2016
(Continued)

*Primary Examiner* — Phuongchau Ba Nguyen
(74) *Attorney, Agent, or Firm* — Jefferson IP Law, LLP

(57) ABSTRACT

An electronic device is provided. The electronic device includes a memory stored with information related to a relay device, a first communication interface comprising circuity, a second communication interface comprising circuitry, and a processor configured to control the first communication interface to communicate with the relay device, control, based on a signal notifying communication connection failure between an external device and the relay device being received from the external device through the second communication interface, the second communication interface to transmit a signal requesting entry into a specific communication mode to the external device, and transmit, based on the external device being identified as entering the communication mode, information related to the stored relay device to the external device through the specific communication mode.

16 Claims, 8 Drawing Sheets

(51) Int. Cl.
    *H04B 7/155*     (2006.01)
    *H04W 84/12*     (2009.01)

(56) References Cited

U.S. PATENT DOCUMENTS

| | | | |
|---|---|---|---|
| 9,998,905 B2 | 6/2018 | Qi et al. | |
| 10,154,444 B2* | 12/2018 | Won | H04W 76/18 |
| 10,477,599 B2* | 11/2019 | Park | H04W 76/11 |
| 10,506,035 B2* | 12/2019 | Kim | H04W 76/14 |
| 11,320,963 B2* | 5/2022 | Yoon | H04W 12/06 |
| 2006/0248369 A1* | 11/2006 | Kumazawa | H04L 12/2898 |
| | | | 714/4.1 |
| 2008/0242292 A1* | 10/2008 | Koskela | H04W 76/19 |
| | | | 455/67.11 |
| 2010/0217845 A1* | 8/2010 | Doshi | H04L 67/125 |
| | | | 709/221 |
| 2011/0092236 A1* | 4/2011 | Iwamura | H04W 76/19 |
| | | | 455/507 |
| 2011/0116629 A1* | 5/2011 | Forsberg | H04W 12/041 |
| | | | 380/44 |
| 2014/0317461 A1* | 10/2014 | Li | H04W 24/04 |
| | | | 714/712 |
| 2019/0141614 A1* | 5/2019 | Wang | H04W 76/11 |
| 2019/0296932 A1 | 9/2019 | Jang et al. | |

FOREIGN PATENT DOCUMENTS

| | | | |
|---|---|---|---|
| KR | 10-1980039 B1 | 5/2019 | |
| KR | 20210060111 A * | 5/2021 | H04W 88/06 |

* cited by examiner

ELECTRONIC DEVICE AND CONTROL METHOD THEREOF

CROSS-REFERENCE TO RELATED APPLICATION(S)

This application is based on and claims priority under 35 U.S.C. § 119(a) of a Korean patent application number 10-2019-0147736, filed on Nov. 18, 2019, in the Korean Intellectual Property Office, the disclosure of which is incorporated by reference herein in its entirety.

BACKGROUND

1. Field

The disclosure relates to an electronic device which induces communication connection between the relay device and one device, and a control method thereof.

2. Description of Related Art

Recently, usage of Internet of Things (IoT) is increasing. For example, a plurality of home appliances may be connected to one router (relay device) within a household and the plurality of home appliances may be controlled through a smartphone.

However, in case an identification (ID) or a password of the router is changed or the router is changed, there is a disadvantage of the plurality of home appliances not being able to perform wireless-fidelity (Wi-Fi) connection with the changed router automatically.

In this case, the user may not intuitively know the connection state with the router for home appliances which do not include a display, and there is an inconvenience of having to connect the changed router with the plurality of home appliances again.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device which induces communication connection of a relay device and one device automatically and a control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a memory stored with information related to a relay device, a first communication interface comprising circuitry, a second communication interface comprising circuitry, and a processor configured to control the first communication interface to communicate with the second communication interface comprising circuitry and the relay device, and based on receiving a signal notifying communication connection failure between an external device and the relay device from the external device through the second communication interface, control the second communication interface to cause a signal requesting entry into a specific communication mode to be transmitted to the external device, and transmit the stored information related to the relay device to the external device through the specific communication mode based on the external device being identified as entering into the communication mode.

In accordance with another aspect of the disclosure, a control method of an electronic device stored with information related to a relay device is provided. The control method includes receiving a signal notifying communication connection failure between an external device and the relay device from the external device, based on receiving a signal notifying the communication connection failure, transmitting a signal requesting an entry into a specific communication mode to the external device, and transmitting the stored information related to the relay device to the external device through the specific communication mode based on the external device being identified as having entered into a communication mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description, taken in conjunction with the accompanying drawings, in which.

The same reference numerals are used to represent the same elements throughout the drawings.

DETAILED DESCRIPTION

Figure 1:
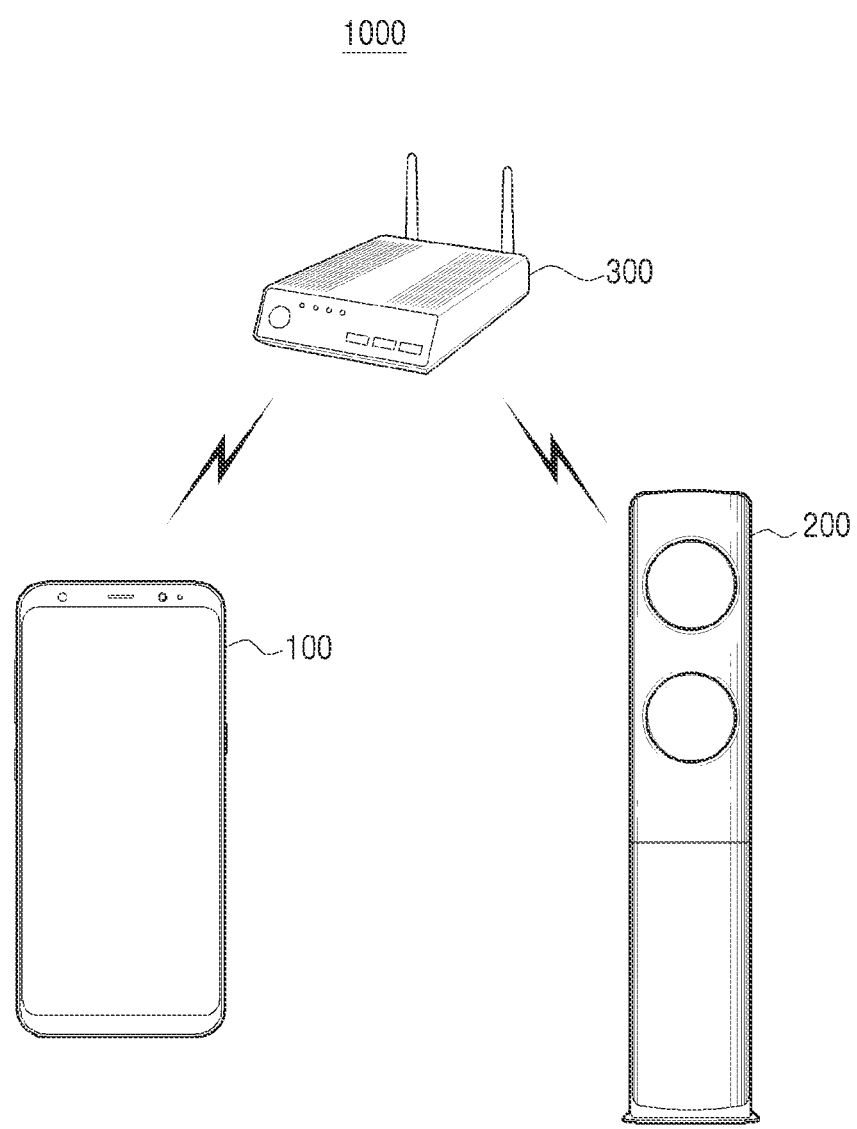
FIG. 1 is a diagram illustrating an electronic system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure have been selected from general terms currently widely used in consideration of the functions in the various example embodiments of the disclosure, but may be changed according to the intention of those skilled in the related art or precedent, emergence of new technologies, and the like. Also, there may be some terms arbitrarily identified by an applicant, and the meanings thereof will be disclosed in detail in the descriptions relevant to the disclosure. Accordingly, the terms used herein may be construed based on the overall contents and the meaning of the term and not simply by the name of the term.

Because various modifications may be made to the embodiments of the disclosure, and there may be various types of embodiments, the specific embodiments will be illustrated in drawings, and described in detail in the detailed description. However, it should be noted that the various embodiments are not intended to limit the scope of the disclosure to a specific embodiment, but should be interpreted to include all modifications, equivalents or alternatives of the embodiments included in the ideas and the technical scope of the disclosure as set forth herein. In case it is determined that in describing embodiments, detailed description of related known technologies may unnecessarily confuse the gist of the disclosure, the detailed description may be omitted.

A singular expression includes a plural expression, unless otherwise specified. It is to be understood that the terms such as "include" or "comprised of" are used herein to designate a presence of a characteristic, number, operation, element, component, or a combination thereof, and not to preclude a presence or a possibility of adding one or more of other characteristics, numbers, operations, elements, components or a combination thereof.

The expression at least one of A and/or B is to be understood as indicating at least one of "A" or "B" or "A and B".

Expressions such as "first," "second," "1st," or "2nd" used in the disclosure may be used to identify various elements regardless of order and/or importance, and may be used merely to differentiate one element from another but the relevant elements should not be limited thereto.

When a certain element (e.g., first element) is indicated as being "(operatively or communicatively) coupled with/to" or "connected to" another element (e.g., second element), it is to be understood as the certain element being directly coupled with/to the other element or as being coupled through still another element (e.g., third element).

The term such as "module" or "unit" may be used to refer to an element that performs at least one function or operation, and such element may be implemented as hardware or software, or a combination of hardware and software. In addition, except for when each of a plurality of "modules" or "units" needs to be realized in a particular hardware, the components may be integrated in at least one module and be realized in at least one processor (not shown). In the disclosure, the term "user" may refer to a person using an electronic device or a device (e.g., electronic device with artificial intelligence) using an electronic device.

Embodiments of the disclosure will be described in detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements.

Embodiments of the disclosure will be described in greater detail below with reference to the attached drawings.

FIG. 1 is a diagram illustrating an electronic system according to an embodiment of the disclosure.

The electronic system 1000 may include an electronic device 100, external device 200, and a relay device 300.

Referring to FIG. 1, the electronic device 100 may be a device which is communicatively connected with the relay device 300 and accordingly, may be a device which is provided with a wireless internet service. In general, the electronic device 100 may be implemented as a home appliance such as, for example, and without limitation, a smartphone, a television (TV), a smart TV, an air conditioner, an air purifier, a washer, a dryer, a refrigerator, or the like, but is not limited thereto, and may be implemented as a device of a variety of forms such as, for example, and without limitation, a tablet personal computer (PC), a desktop PC, a laptop PC, a netbook computer, an e-book reader, a personal digital assistant (PDA), a portable multimedia player (PMP), an MP3 player, a medical device, a camera, a wearable device, or the like.

The electronic device 100 may, when a service set identifier (SSID) or a password of the relay device 300 is changed or the relay device 300 itself is changed, be a device which stores information related to the changed relay device 300. For example, information related to the changed relay device 300 for Wi-Fi connection with the relay device 300 may be input to a smartphone (electronic device 100) by a user input. Accordingly, the electronic device 100 may be a device communicatively connected with the current relay device 300.

The external device 200 may also be a device which is communicatively connected with the relay device 300 and is capable of receiving a wireless internet service. However, the external device 200 may be a device which failed in communicatively connected with the relay device 300 which is communicatively connected with the current electronic device 100 for reasons such as the SSID or password of the previous communicatively connected relay device 300 being changed or the relay device 300 being changed. The another electronic device 200 as described above may be implemented as a home appliance like the electronic device 100, but is not limited thereto.

The relay device 300 may be a device which assists in connecting to a network so that the electronic device 100 and the external device 200 may use the wireless internet service. The relay device 300 may be referred to as an access point (AP), and may be connected to a router and relay data between the electronic device 100 and a device on a network or relay data between the external device 200 and a device on the network.

According to an embodiment, the relay device 300 may be implemented as a wireless access point (WAP) which uses a related standard that uses Wi-Fi (or wireless local area network (LAN)). In this case, the electronic device 100 and the external device 200 may perform communication with the relay device 300 through a Wi-Fi network.

According to an embodiment of the disclosure, when the relay device 300 to which the current electronic device 100 is communicatively connected and the external device 200 is not communicatively connected for reasons such as the SSID or password of the relay device 300 to which the external device 200 was previously communicatively connected is changed or the relay device 300 itself is changed, an operation requiring a separate user operation to cause communication connection to be performed between the external device 200 and the relay device 300 has been required. In addition, when the external device 200 is in plurality, a plurality of user operations were required.

However, according to the various embodiments of the disclosure, based on information on the relay device 300 to which the current electronic device 100 is connected such as the changed password information being stored in the electronic device 100, the electronic device 100 may, by transmitting information related to the relay device 300 to the external device 200, perform communication connection between the external device 200 and the relay device 300 without a separate user operation, and the above will be described in greater detail below.

Figure 2:
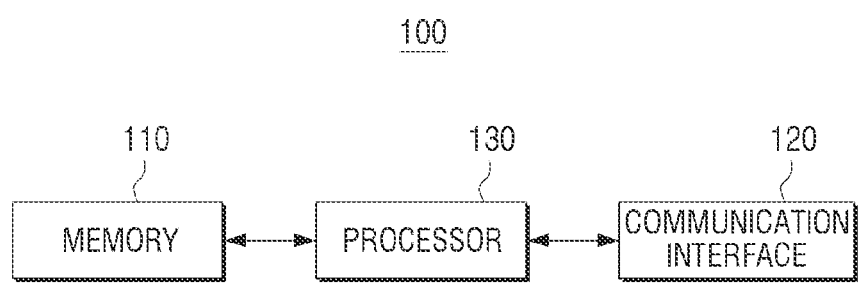
FIG. 2 is a block diagram illustrating an operation of an electronic device according to an embodiment of the disclosure.

FIG. 2 is a block diagram illustrating an operation of an electronic device according to an embodiment of the disclosure.

Referring to FIG. 2, the electronic device 100 may include a memory 110, a communication interface 120, and a processor 130.

The memory 110 may be implemented as a memory form embedded in the electronic device 100 according to a data storage use, or as a memory form attachable or detachable to the electronic device 100. For example, the data for the driving of the electronic device 100 may be stored in a memory embedded to the electronic device 100, and data for an expansion function of the electronic device 100 may be stored in a memory attachable or detachable to the electronic device 100. The memory embedded in the electronic device 100 may be implemented as at least one of a volatile memory (e.g., a dynamic random access memory (DRAM), a static RANI (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)), and in the case of a memory attachable or detachable to the electronic device 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

According to an embodiment, the memory 110 may store information related to the relay device 300. To prevent confusion, the relay device 300 will be described below as referring to the relay device after change when it is a relay device after the SSID or password has been changed or the relay device itself is changed. The information related to the relay device 300 may include at least one from among the SSID information of the relay device 300, the password information, or the address information. The SSID information may be a name information of a network to which the relay device 300 is connected. The address information may include a Mac address information or an IP address information of the relay device 300, or the like.

In addition, the memory 110 may store identification information of at least one device registered to a service account which is identical with that of the electronic device 100. The service account refers to a concept including user authentication in which a login is performed based on an identification (ID) and password. For example, when home appliances such as, for example, and without limitation, a TV, an air conditioner, a refrigerator, or the like within the household is communicatively connected with the relay device 300 and implemented as an IoT, the TV, home appliances such as, for example, and without limitation, the air conditioner, the refrigerator, or the like may be registered to one service account. The memory 110 may receive the identification information of another device registered to the service account to which the electronic device 100 is registered from the server (not shown).

The communication interface 120 may include circuitry, and may be a configuration capable of transmitting and receiving a signal with an external device 200 and the relay device 300

According to an embodiment, the communication interface 120 may perform communication with the external device 200 and the relay device 300 through a wireless communication. In this case, communication with the external device 200 and the relay device 300 may be performed through communication interfaces different from each other. For example, a first communication interface may perform communication with the relay device 300, and a second communication interface may perform communication with the external device 200.

The communication interface including the first communication interface and the second communication interface may include a Wi-Fi module (not shown), a Bluetooth module (not shown), an infrared (IR) module, a local area network (LAN) module, an Ethernet module, or the like. Each communication module may be realized as at least one hardware chip form. The wireless communication module may include at least one communication chip performing communication according to various wireless communication standards such as, for example, and without limitation, ZigBee, universal serial bus (USB), Mobile Industry Processor Interface Camera Serial Interface (MIPI CSI), 3rd Generation (3G), 3rd Generation Partnership Project (3GPP), Long Term Evolution (LTE), LTE Advanced (LTE-A), 4th Generation (4G), 5th Generation (5G), or the like in addition to the above-described communication methods. Specifically, the first communication interface may be implemented as a Wi-Fi module, and the Wi-Fi module may perform communication according to at least one standard version from among 802.11a, 802.11b, 802.11g, 802.11n, and 802.11ac, but is not limited thereto, and new versions to be developed hereafter may also be included.

In addition, the second communication interface may be implemented as a Bluetooth module or a Wi-Fi module. For example, the second communication interface may receive a signal notifying communication connection failure between the external device 200 and the relay device 300 from the external device 200 through the Bluetooth module, and transmit information related to the relay device 300 to the external device 200 through the Wi-Fi module. However, the embodiment is not limited thereto.

According to another embodiment, the communication interface 120 may perform communication with the external device 200 and the relay device 300 through a wired communication.

The processor 130 may control the overall operation of the electronic device 100.

According to an embodiment of the disclosure, the processor 130 may be implemented as a digital signal processor (DSP) processing a digital signal, a microprocessor, or a time controller (TCON). However, the embodiment is not limited thereto, and the embodiment may include one or more from among a central processing unit (CPU), a micro controller unit (MCU), a micro processing unit (MPU), a controller, an application processor (AP), a communication processor (CP), an ---(ARM) processor, and an artificial intelligence (AI) processor, or may be defined by the corresponding term. In addition, the processor 130 may be implemented as a system on chip (SoC) having a built-in processing algorithm and as a large scale integration (LSI), or in a field programmable gate array (FPGA) form. The processor 130 may, by executing computer executable instructions stored in the memory 110, perform various functions.

According to an embodiment of the disclosure, the processor 130 may receive a signal notifying communication connection failure between the external device 200 and the relay device 300 from the external device 200 through the second communication interface.

According to an embodiment, the external device 200 may, based on communication connection with the relay device 300 not being performed, broadcast the signal notifying communication connection failure through a Bluetooth Low Energy (BLE) communication method. In other words, the external device 200 may, if the relay device 300 after the SSID or password is changed or the relay device itself is changed and communication connection is not performed with the relay device 300 after being changed, broadcast the signal notifying communication connection failure. The second communication interface may be implemented as a Bluetooth module. Because the external device 200 may transmit a signal notifying communication connection failure while in a state of being unable to recognize the device containing the information related to the relay device 300, it is preferable to notify through a broadcast method and not a unicast method of designating a Mac address of a specific device to a destination information of the signal. The destination information of the signal notifying communication connection failure may be allocated with FF:FF:FF:FF:FF:FF. However, the embodiment is not limited thereto, and the external device 200 may transmit the signal notifying communication connection failure through the unicast or multicast method depending on circumstance.

The signal notifying communication connection failure may include at least one from among the identification information of the external device 200 or the information related to a cause of the communication connection failure. The identification information of the external device 200 may include the Mac address information of the external device 200, a name of a product, a serial number, a manufacture's information, or the like. In addition, the information related to the case of the communication connection failure may include, for example, and without limitation, a state of the SSID information not being a match, a state of the password information not being a match, a state of the relay device being changed, a state of the relay device not being identified, or the like. The information related to the cause of the communication connection failure may be information generated based on a 802.11 Death Reason Codes.

According to another embodiment, the external device 200 may, when communication connection with the previously connected relay device is disconnected, broadcast a signal notifying communication connection failure through the BLE communication method.

The processor 130 may periodically receive identification information of at least one device registered to the same service account as the electronic device 100 from the server through the relay device 300 and store in the memory 110. The service account may be a concept including user authentication which is performed by a login based on an ID and a password, and may be realized by, for example, and without limitation, a SAMSUNG™ account, a GOOGLE™ account, or the like. In addition, the server may, as a server managing a service account, store the identification information of at least one device registered to the service account.

The processor 130 may, based on a signal notifying communication connection failure being received, identify whether or not the identification information of the external device 200 included in the signal matches with the stored identification information. According to an embodiment, the processor 130 may compare whether the Mac address information of the external device 200 included in the signal notifying communication connection failure matches with the at least one Mac address information registered to the stored service account.

The processor 130 may, based on the identification information of the external device 200 being identified as matching with the stored identification information, that is, the medium access control (MAC) address information of the external device 200 matching with the stored Mac address information, control the second communication interface to transmit the signal requesting entry into a specific communication mode to the external device 200. For example, the processor 130 may transmit a signal requesting entry into a specific communication mode to the external device 200 through the BLE communication method.

The specific communication method herein refers to a Soft Access Point (AP) mode, and the Soft AP mode may be a mode in which a client device realizes the role of a wireless AP through a software and operate like a wireless AP. The Soft AP mode according to an embodiment may be implemented as the Wi-Fi Direct mode.

The external device 200 may be connected with the electronic device 100 and perform a Device to Device (D2D) communication when entering the Soft AP mode.

Specifically, the external device 200 may, based on a signal requesting entry into a specific communication mode being received from the electronic device 100, identify whether the identification information of the electronic device 100 included in the signal matches with the stored identification information. The external device 200 may also, like the electronic device 100, receive the identification information of at least one device registered to the same service account as the external device 200 from the server and store the identification information. Accordingly, the external device 200 may compare the Mac address information of the electronic device 100 included in the signal transmitted from the electronic device 100 with the stored Mac address information and identify whether or not the information is a match. The external device 200 may, when the identification information of the electronic device 100 included in the signal transmitted from the electronic device 100 is identified as matching with the stored identification information, enter into a specific communication mode.

The electronic device 100 may identify whether or not the external device 200 entered into a specific communication mode. For example, when the external device 200 enters into the Wi-Fi Direct mode, the electronic device 100 may identify the external device 200 from a Wi-Fi Direct list.

The processor 130 may attempt to connect (or access) to a specific communication mode of the external device 200 when the external device 200 is identified as having entered into a specific communication mode.

According to an embodiment, the processor 130 may control a third communication interface to communicatively connect with the external device 200 which entered into a specific communication mode. For example, the processor 130 may attempt to communicatively connect with the external device 200 through the Wi-Fi communication method. In this case, the third communication interface may be implemented as a communication module different from the above-described second communication interface, and in an example, the second communication interface may be implemented as a Bluetooth module and the third communication interface may be implemented as the Wi-Fi module.

According to another embodiment, the processor 130 may control the second communication interface 120-3 to communicatively connect with the external device 200 which entered into a specific communication mode. For example, the processor 130 may attempt to communicatively connect with the external device 200 through the Bluetooth communication method, and in this case, the second communication interface may be implemented as the Bluetooth module.

Based on the electronic device 100 being connected to the specific communication mode of the external device 200, a signal notifying connection completion may be received from the external device 200. Thereafter, the processor may transmit information related to the stored relay device 300 to the external device 200 through the specific communication mode. The information related to the relay device 300 may include at least one from among the SSID information, the password information or the address information of the relay device 300. The SSID information may be a name information of the network to which the relay device 300 is connected. The address information may include the Mac address information of the relay device 300, the IP address information, or the like.

The processor 130 may transmit information related to the relay device 300 to the external device through the specific communication mode, and terminate the connection with the external device 200 through the specific communication mode. Because the specific communication mode may be a mode for transmitting information related to the relay device 300, is may be preferable for the external device 200 to terminate the specific communication mode when the information related to the relay device 300 is transmitted, and it may be preferable for the processor 130 to terminate the connection through the specific mode.

The external device 200 may perform communication connection with the relay device 300 based on information related to the relay device 300 transmitted from the electronic device 100.

According to an embodiment, the external device 200 may, based on the address information of the relay device 300 included in the information related to the relay device 300 matching with the address information of the previously connected relay device, perform communication connection with the relay device 300. The relay device 300, in this case, may not be changed, and the external device 200 may perform communication connection with the relay device 300 based on the changed SSID information or the password information transmitted from the electronic device 100.

According to another embodiment, the external device 200 may, based on the address information of the relay device 300 included in the information related to the relay device 300 not matching with the address information of the previously connected relay device, identify whether or not to perform communication connection with the relay device 300 based on an intensity of the signal transmitted from the relay device 300. Specifically, the external device 200 may determine whether or not to perform communication connection with the relay device 300 based on a received signal strength indication (RSSI) information.

For example, the external device 200 may perform communication connection with the relay device 300 when the intensity of the signal transmitted from the relay device 300 is greater than or equal to a predetermined value, and may not perform communication connection with the relay device 300 when the intensity of the signal transmitted from the relay device 300 is less than a predetermined value.

According to an embodiment, the electronic device 100 may include a display (not shown).

The processor 130 may, when the signal notifying failure in communication connection is received from the external device 200, control the display (not shown) to display information related to a cause of communication connection failure included in the signal notifying failure in communication connection. According to an embodiment, code information related to the cause of communication connection failure may be included in the signal notifying failure in communication connection. The code information may be information related to the 802.11 Deauth Reason Codes. In the memory 110, a table on the code information may be stored, and accordingly, the processor 130 may compare the received code information with the table on the stored code information and obtain cause information for communication connection failure. For example, when the relay device which was previously connected with the external device 200 is changed, the processor 130 may receive a code 2, and accordingly, a user interface (UI) such as "the previous relay device is no longer valid" may be provided through the display. Alternatively, the processor 130 may also provide a speech message of "the previous relay device is no longer valid" through a speaker (not shown). The message content such as the above is merely one embodiment, and when representing cause information on failure, the message may be modified to various forms and provided. The above will be described in greater detail in FIG. 3.

According to another embodiment, the electronic device 100 may not include a display.

The processor 130 may identify a device including a display from among the at least one device registered to the same service account as the electronic device 100. For example, the processor 130 may identify an air conditioner or the like which includes a TV or display function.

The processor 130 may, based on a signal notifying communication connection failure being received from the external device 200, transmit a signal notifying communication connection failure including information related to a cause of communication connection failure to a device identified as including a display. For example, based on the external device 200 being an air purifier and the device including the display being identified as a TV, the TV may provide information related to the cause of communication connection failure that communication connection between the air purifier and the relay device 300 failed based on a signal including information related to the cause of the communication connection failure transmitted from the electronic device 100 and that communication connection failed due to device change of the relay device. Accordingly, a user may recognize the communication connection state between the air purifier and the relay device 300.

However, the embodiment is not limited thereto, and the processor 130 may transmit information related to the cause of the communication connection failure to the server associated with the service account. Accordingly, the server may identify the device including the display, and transmit information related to the cause of the communication connection failure to the corresponding device.

The processor 130 may, when the signal identifying communication connection failure is received from the external device 200, provide a message asking whether or not to communicatively connect the relay device 300 with the external device 200.

For example, based on the electronic device 100 including a display, the processor 130 may provide an inquiry message such as "would you like to connect the external device 200 (e.g., air purifier) to the relay device 300 (e.g., AA router)?" through the display.

Alternatively, based on the electronic device 100 including a speaker, the processor 130 may provide a speech inquiry message such as "would you like to connect the external device 200 (e.g., air purifier) to the relay device 300 (e.g., AA router)?" through the speaker.

Thereafter, when a user feedback is input, the processor 130 may determine whether or not communication connection may be performed between the external device 200 and the relay device 300 based on the user feedback.

However, whether or not to provide a message asking whether or not to perform communication connection may be determined based on a setting of the electronic device 100. For example, if the electronic device 100 is set to an "automatic connection," the processor 130 may not provide an inquiry message to the user and perform communication connection between the external device 200 and the relay device 300. Alternatively, if the electronic device 100 is not set to the "automatic connection," the processor 130 may provide an inquiry message as described above. Accordingly, the automatic connection may be applied to all devices registered to the service account, but is not limited thereto, and whether or not to the automatically connect may be set per device.

The external device 200 may perform a role such as the electronic device 100 after receiving information related to the relay device 300 from the electronic device 100 through the specific communication mode. For example, a first device may broadcast a signal notifying communication connection failure with the relay device 300 and the information related to the relay device 300 may be received from the electronic device 100. Thereafter, based on a second device broadcasting a signal notifying communication connection failure with the relay device 300 and the first device receiving the signal, information related to the relay device 300 may be transmitted to the second device through the specific mode based on the above-described embodiment of the disclosure.

The electronic device 100 may, as described above, additionally include a display, an audio outputter, and a user inputter.

The display may be a configuration which displays various content or information. The display may display information on the external device 200 that failed in communication connection with the relay device 300 and information on the cause of the communication connection failure. For example, the display may display a text message or image such as "the air purifier has failed in connecting with the changed router."

The display may be implemented as a display of a variety of forms such as, for example, and without limitation, a liquid crystal display (LCD), an organic light-emitting diode (OLED), a Liquid Crystal on Silicon (LCoS), a Digital Light Processing (DLP), a quantum dot (QD) display panel, a quantum dot light-emitting diodes (QLED), a micro light-emitting diode (micro LED), or the like.

The display may be implemented in a touchscreen form comprising a touch pad and an inter-layered structure. The touchscreen may be configured to detect not only a touch input position and area but also a touch input pressure.

The audio outputter may be a configuration for outputting speech data. The audio outputter may be implemented as a speaker, and may be implemented as an external configuration of the electronic device 100 such as a sound bar according to circumstance. The audio outputter may provide in speech the information of the external device 200 that failed in communication connection with the relay device 300 and the information on the cause of the communication connection failure.

The user inputter may be a configuration for receiving input of various user commands and information. The processor 130 may execute a function corresponding to a user command input through the user inputter, or store the information input through the user inputter in the memory 110.

The user inputter may include a microphone (not shown) for receiving the user command in a speech form, or may be implemented as a display for receiving input of the user command in a touch form.

Figure 3:
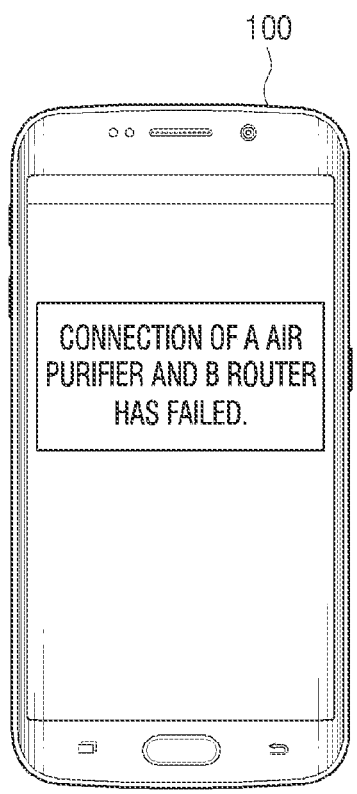
FIG. 3 is a diagram illustrating an example of a device which includes a display providing cause information for failure in communication connection according to an embodiment of the disclosure.

FIG. 3 is a diagram illustrating an example of a device which includes a display providing cause information for failure in communication connection according to an embodiment of the disclosure.

In an example, the electronic device 100 may be implemented as a smartphone, and the external device 200 may be implemented as an air purifier.

The external device 200 may broadcast a signal notifying communication connection failure through the BLE communication method when communication connection with the relay device 300 is not performed. Because the external device 200 does not know which device stores information related to the relay device 300, a signal included with identification information of the external device 200 with the Mac address of a counterpart device not set, information notifying communication connection failure, and information related to the cause of the communication connection failure may be broadcast.

The electronic device 100 which includes the display that received the signal transmitted from the external device 200 may identify whether or not the external device 200 is the device registered to the same service account as the service account to which the electronic device 100 is registered. For example, if the electronic device 100 receives a signal transmitted from a device next door, because the corresponding device is not the device registered within the same service account, the device may be ignored. In other words, whether or not connection to the same network may be determined based on verifying whether or not the device is registered to the same service account, and thus security may be strengthened.

The electronic device 100 may, based on the external device 200 being identified as the device registered to the same service account, provide information notifying communication connection failure between the external device 200 and the relay device 300 based on the signal transmitted from the external device through a user interface (UI). The UI may include the identification information of a product name, a device name, or the like of the external device 200, and the identification information of a product name, a device name, or the like of the relay device 300.

For example, the electronic device 100 may provide information on the communication connection state such as "connection of A air purifier and B router has failed" through the display.

Alternatively, the electronic device 100 may provide information related to the cause of the communication connection failure in addition to the communication connection state, such as "connection of A air purifier and B router has failed due to password not matching."

Based on the automatic connection setting not being set in the electronic device 100, the electronic device 100 may provide an inquiry message such as "would you like to connect A air purifier with B router?" through the display. When a feedback to proceed is input from the user, the electronic device 100 may provide information related to the relay device 300 to the external device 200 and perform communication connection between the A air purifier and the B router. Alternatively, when feedback not to proceed with connection is input from the user, the electronic device 100 may not perform a separate operation with respect to communication connection between the A air purifier and the B router.

In addition, when the automatic connection is set in the electronic device 100, the electronic device 100 may not provide a separate inquiry message and perform communication connection between the A air purifier and the B router by providing information related to the relay device 300 to the external device 200.

The electronic device 100 may, based on a signal notifying communication failure transmitted from the external device 200 being received, provide information on a communication state between the external device 200 and the relay device 300 through the display, but is not limited thereto, and when an application for using IoT such as SmartThings™ is executed, the electronic device 100 may also provide information on the communication state between the external device 200 and the relay device 300.

Figure 4:
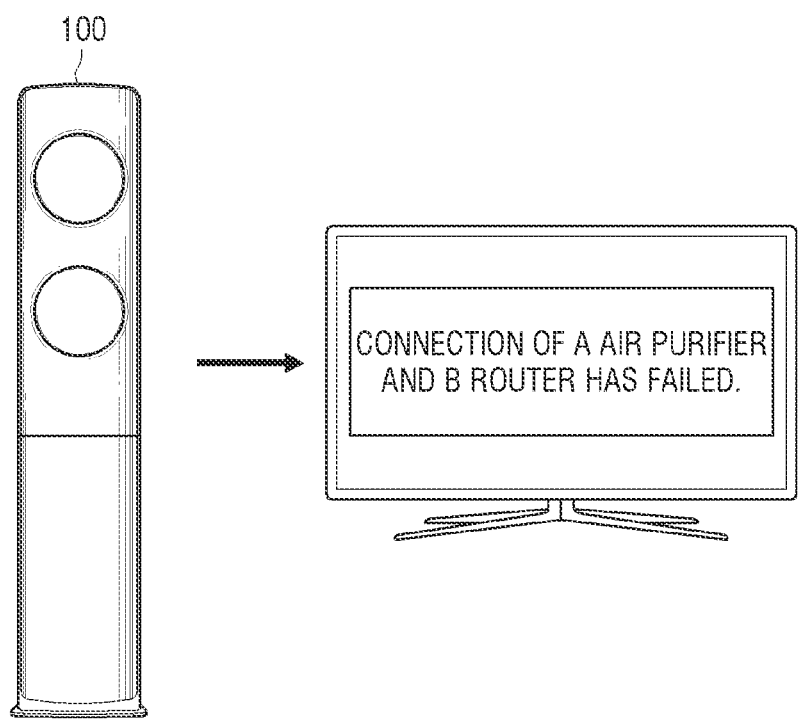
FIG. 4 is a diagram illustrating an example of a device which does not include a display providing cause information for failure in communication connection according to an embodiment of the disclosure.

FIG. 4 is a diagram illustrating an example of a device which does not include a display providing cause information for failure in communication connection according to an embodiment of the disclosure.

In an example, the electronic device 100 may be implemented as an air conditioner which does not include a display, and the external device 200 may be implemented as an air purifier.

Like FIG. 3, the electronic device 100 which received the signal notifying communication connection failure from the external device 200 may identify whether or not the external device 200 is the device registered to the same service account as the service account to which the electronic device 100 is registered. In addition, the electronic device 100 may identify the device including the display from among the devices registered in the service account. For example, the electronic device 100 may identify the TV as the device including the display.

The electronic device 100 may, based on the external device 200 being identified as the device registered to the same service account, transmit information related to the communication connection state between the external device 200 and the relay device 300 and the cause of the communication connection failure based on the signal transmitted from the external device 200 and the identification information of the external device 200 and the relay device 300 to the TV. The TV may provide information notifying communication connection failure between the external device 200 and the relay device 300 through the UI.

For example, the TV may provide information on the communication connection state such as "connection of A air purifier and B router has failed" through the display.

Alternatively, the TV may provide information related to the cause of the communication connection failure in addition to the communication connection state such as "connection of A air purifier and B router has failed due to the password not matching."

Based on the automatic connection not being set in the electronic device 100, the TV may provide an inquiry message such as "would you like to connect A air purifier and B router?" through the display. When a feedback to proceed with connection is input from the user, the TV may transmit the input to the electronic device 100, and the electronic device 100 may provide information related to the relay device 300 to the external device 200 and perform communication connection between the A air purifier and the B router. Alternatively, when a feedback not to proceed with connection is input from the user, the TV may transmit the input to the electronic device 100, and the electronic device 100 may not perform a separate operation with respect to communication connection between the A air purifier and the B router.

Figure 5:
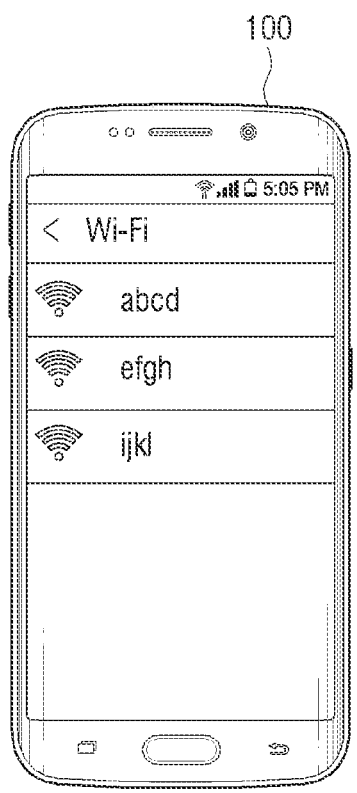
FIG. 5 is a diagram illustrating a specific communication mode of an electronic device according to an embodiment of the disclosure.

FIG. 5 is a diagram illustrating a specific communication mode of an electronic device according to an embodiment of the disclosure.

The electronic device 100 may, based on the Mac address information of the external device 200 and the stored Mac address information being identified as a match, transmit a signal requesting entry into a specific communication mode to the external device 200.

The external device 200 may, based on a signal requesting entry into a specific communication mode being received from the electronic device 100, identify whether the identification information of the electronic device 100 included in the signal matches with the stored identification information. The external device 200 may, based on the identification information of the electronic device 100 included in the signal transmitted from the electronic device 100 being identified as matching with the stored identification information, enter into a specific communication mode.

For example, the external device 200 may enter into a Wi-Fi Direct mode. Accordingly, the external device 200 may transmit a signal requesting connection to the Wi-Fi Direct mode to the outside through a Wi-Fi module. The signal requesting connection to the Wi-Fi Direct mode may be included with identification information including a Mac address information of the external device 200.

The electronic device 100 may, after transmitting the signal requesting entry into the specific communication mode to the external device 200, identify the signal requesting connection to the specific communication mode.

Referring to FIG. 5, a plurality of signals related to Wi-Fi Direct may be identified. The electronic device 100 may obtain identification information included in the plurality of signals related to Wi-Fi Direct, and identify identification information matching with the Mac address of the external device 200 which requested entry into the specific communication mode from among the obtained identification information. For example, based on the signal matching with the Mac address of the external device 200 being abcd, the electronic device 100 may identify the abcd as a signal corresponding to the external device 200.

The electronic device 100 may communicatively connect with the Wi-Fi Direct corresponding to the corresponding identification information. Accordingly, the electronic device 100 and the external device 200 may be D2D connected, and the electronic device 100 may transmit information related to the relay device 300 to the external device 200.

Because the information related to the relay device 300 may be included with the SSID information, the password information, the address information, or the like of the relay device 300, the information may be information requiring security. For example, when a foreign intruder sniffs information of the relay device 300 without permission, the intruder may intrude the network to which the relay device 300 is connected without permission. Accordingly, rather than the broadcast method of transmitting information related to the relay device 300 to the outside, it may be preferable for the electronic device 100 to employ a unicast method of transmitting to the external device 200 through the D2D connection.

Figure 6:
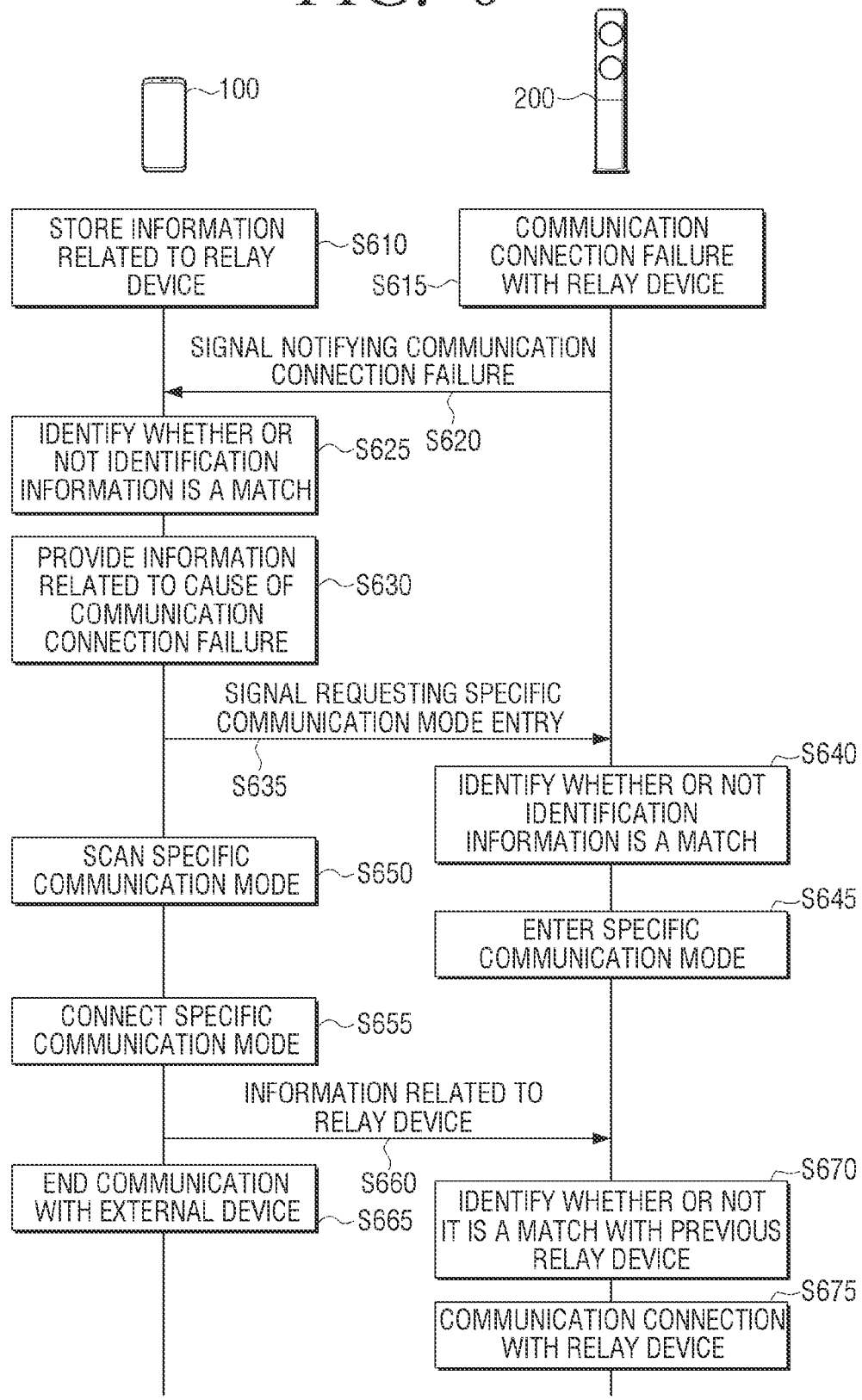
FIG. 6 is a sequence diagram illustrating an operation between an electronic device and an external device according to an embodiment of the disclosure.

FIG. 6 is a sequence diagram illustrating an operation between an electronic device and an external device according to an embodiment of the disclosure.

In an example, the electronic device 100 may be implemented as a smartphone and the external device 200 may be implemented as an air conditioner.

When the relay device is changed or the SSID or password of the existing relay device is changed, the changed SSID or password may be input to the electronic device 100 by the user. Accordingly, the electronic device 100 may store information related to the relay device 300 (S610). In general, when the SSID or password of the relay device is changed, because the user inputs the changed information to the smartphone, it is preferable for the electronic device 100 to be implemented as a smartphone, but the embodiment is not limited thereto.

According to an example, the external device 200 may fail in communication connection with the relay device 300 because the relay device is changed or the SSID or the password of the existing relay device is changed (S615). In this case, the external device 200 may broadcast a signal notifying communication connection failure with the relay device 300 to the outside through the BLE communication method (S620).

According to another example, based on the external device 200 failing in communication connection with an existing relay device because of the relay device being changed or the SSID or the password of an existing relay device being changed, a signal notifying communication connection failure with the existing relay device may be broadcast.

The electronic device 100 may receive the broadcast signal, and identify whether the identification information included in the signal matches with the identification information of the device registered to the service account (S625). Based on the identification information included in the signal broadcast from the external device 200 matching with the stored identification information, the electronic device 100 may provide information related to the cause of the communication connection failure included in the broadcast signal (S630).

In an example, if the electronic device 100 is provided with a display, information related to the cause of the communication connection failure may be displayed through the display, and if the electronic device 100 is not provided with a display, information related to the cause of the communication connection failure may be transmitted to a device provided with a display. Accordingly, the device provided with a display may display information related to the cause of the communication connection failure between the external device 200 and the relay device 300.

The electronic device 100 may transmit a signal requesting entry into a specific communication mode to the external device 200 (S635). In an example, the electronic device 100 may transmit a signal requesting entry into a Soft AP mode through the BLE communication method.

The external device 200 may, based on a signal requesting entry into a specific communication mode being received from the electronic device 100, identify whether the identification information included in the signal matches with the identification information of the device registered to the service account to which the external device 200 is registered (S640). For example, based on the Mac address information of the received electronic device 100 matching with the Mac address information stored in the external device 200, the external device 200 may enter into a specific communication mode (S645). For example, the external device 200 may enter into the Wi-Fi Direct mode.

The electronic device 100 may transmit a signal requesting entry into a specific communication mode to the external device 200, and scan the signal on the specific communication mode (S650). For example, the electronic device 100 may identify the Wi-Fi Direct signal.

The electronic device 100 may attempt to connect to the scanned specific communication mode (S655). For example, the electronic device 100 may obtain the identification information included in the identified Wi-Fi Direct signal, and determine whether the obtained identification information matches with the identification information of the external device 200. Based on a plurality of Wi-Fi Direct signals being received, the electronic device 100 may perform communication connection with the signal matching with the identification information of the external device 200. Accordingly, the Wi-Fi Direction connection may be performed between the electronic device 100 and the external device 200.

However, the embodiment is not limited thereto, and the electronic device 100 may directly enter into a specific communication mode, and the electronic device 100 and the external device 200 may be connected by requesting connection to a specific communication mode to the external device 200.

Then, the electronic device 100 may transmit information related to the relay device 300 to the external device 200 (S660). In an example, in a state in which the security is strengthened through Wi-Fi Direct, the electronic device 100 may transmit at least one from among the SSID information, the password information, or the address information of the relay device 300 to the external device 200. The information related to the relay device 300 transmitted to the external device 200 may be information which is input and stored in S610. The electronic device 100 may transmit information related to the relay device 300 to the external device 200 and terminate communication with the external device 200 (S665).

The external device 200 may, based on information related to the relay device 300 being received from the electronic device 100, compare the address information of the relay device 300 included in the information related to the relay device 300 with the address information of the previously connected relay device and identify whether or not the addresses match (S670).

In an example, based on the relay device 300 being the same device as an existing relay device, the address information may be a match, and the external device 200 may, based on the SSID information and the password information of the relay device 300, perform communication connection with the relay device 300 (S675).

In another example, based on the relay device 300 being a device different from an existing relay device, the address information may not be a match, and the external device 200 may identify the signal intensity of the relay device 300.

The external device 200 may, based on the identified signal intensity being a predetermined value or more, perform communication connection with the relay device 300, and based on the identified signal intensity being less than a predetermined value, not perform communication connection with the relay device 300.

Figure 7:
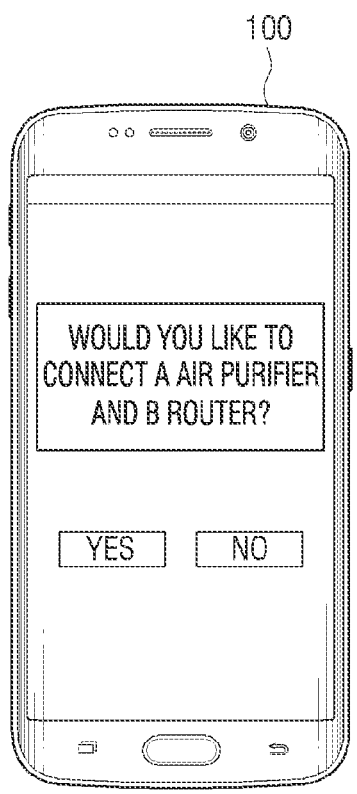
FIG. 7 is a diagram illustrating a user interface (UI) asking whether or not to communicatively connect between a relay device and an external device according to an embodiment of the disclosure.

FIG. 7 is a diagram illustrating a user interface (UI) asking whether or not to communicatively connect between a relay device and an external device according to an embodiment of the disclosure.

The electronic device 100 may, based on a signal notifying communication connection failure being received from the external device 200, provide a message inquiring whether to communicatively connect between the relay device 300 and the external device 200.

For example, the electronic device 100 may provide a UI included with a text such as "would you like to connect A air purifier with B router?" through the display. When user feedback on "yes" or "no" which is provided together therewith is input, the electronic device 100 may determine connection of the A air purifier with the B router based therefrom.

However, the above-described text is merely one example, and may be changed and provided.

In addition, based on a display not being provided in the electronic device 100, the electronic device 100 may transmit an inquiry message to a device provided with a display. Alternatively, the electronic device 100 may also provide an inquiry message in speech through the speaker.

Figure 8:
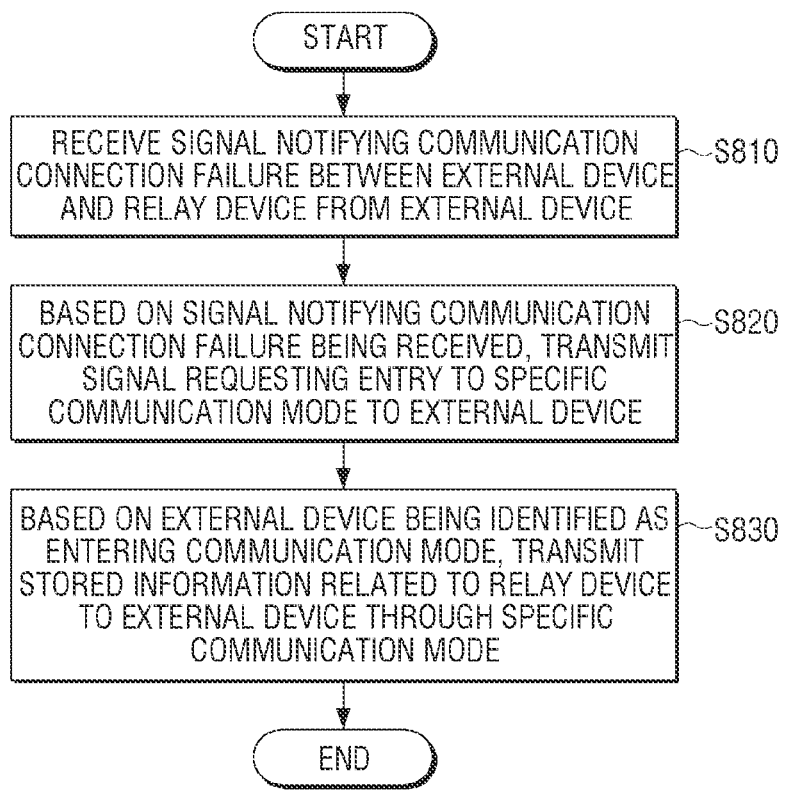
FIG. 8 is a flowchart illustrating a control method of an electronic device stored with information related to a relay device according to an embodiment of the disclosure.

FIG. 8 is a flowchart illustrating a control method of an electronic device stored with information related to a relay device according to an embodiment of the disclosure.

The electronic device 100 may receive a signal notifying communication connection failure between the external device 200 and the relay device 300 from the external device 200 at operation S810.

The signal notifying communication connection failure may include at least one from among the identification information of the external device 200 or the information related to the cause of the communication connection failure. In addition, the signal notifying communication connection failure may be broadcast through the BLE communication method.

According to an example, the electronic device 100 may, based on a signal notifying communication connection failure being received, display information related to the cause of the communication connection failure included in the signal which notifies communication connection failure.

According to another example, the electronic device 100 may identify a device including a display from among at least one device registered to the same service account as the electronic device 100, and based on a signal notifying communication connection failure being received from the external device 200, transmit, to the identified device, a signal notifying communication connection failure including information related to the cause of the communication connection failure.

In addition, the electronic device 100 may, based on a signal notifying communication connection failure being received from the external device 200, provide a message asking whether or not to communicatively connect between the relay device 300 and the external device 200.

The electronic device 100 may, based on a signal notifying communication connection failure being received, transmit a signal requesting entry into a specific communication mode to the external device 200 at operation S820.

The communication mode herein may be the soft AP mode.

Specifically, the electronic device 100 may store the identification information of at least one device registered to the same service account as the electronic device 100. The electronic device 100 may, based on a signal notifying communication connection failure being received, identify whether the identification information of the external device 200 included in the signal matches with the stored identification information. Specifically, when the identification information of the external device 200 is identified as matching with the stored identification information, the electronic device 100 may transmit the signal requesting entry into a specific communication mode to the external device 200.

The electronic device 100 may, based on the external device 200 being identified as entering into a communication mode, transmit information related to the stored relay device to the external device through the specific communication mode at operation S830. The information related to the relay device may include at least one from among the SSID information, the password information or the address information of the relay device.

The external device 200 may, based on the address information of the relay device 300 included in the information related to the relay device 300 matching with the address information of the previously connected relay device 300, perform communication connection with the relay device 300.

Alternatively, the external device 200 may, based on the address information of the relay device 300 included in the information related to the relay device 300 not matching with the address information of the previously connected relay device 300, identify whether or not to perform communication connection with the relay device 300 based on the signal intensity transmitted from the relay device 300.

The methods according to the various embodiments of the disclosure described above may be realized in an application form capable of being installed to an existing electronic device.

In addition, the methods according to the various embodiments of the disclosure described above may be realized with only a software upgrade or with only a hardware upgrade on the existing electronic device.

In addition, the various embodiments of the disclosure described above may be performed through an embedded server provided in the electronic device or performed through at least one external server from among the electronic devices.

According to an embodiment of the disclosure, the various embodiments described above may be implemented as a software including instructions stored in a machine-readable storage media (e.g., a computer). The machine, which calls a stored instruction from a storage medium, and as a device capable of operating according to the called instruction, may include an electronic device according to the disclosed embodiments. When an instruction is executed by the processor, the processor may directly, or under the control of the processor perform a function corresponding to the instruction using different elements. The instruction may include a code generated by a compiler or executed by an interpreter. The machine-readable storage medium may be provided in the form of a non-transitory storage medium. The term "non-transitory" only denotes that a storage medium does not include a signal but is tangible, and does not distinguish the case in which data is semi-permanently stored in a storage medium from the case in which data is temporarily stored in a storage medium.

In addition, according to an embodiment of the disclosure, the method according to the various embodiments described above may be provided included in a computer program product. The computer program product may be exchanged between a seller and a purchaser as a commodity. The computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be at least temporarily stored or temporarily generated in a storage medium such as a manufacturer's server, a server of an application store, or a memory of a relay server.

In addition, according to an embodiment of the disclosure, the various embodiments described above may be implemented in a recordable medium which is readable by computer or a device similar to computer using software, hardware, or the combination of software and hardware. In some cases, the embodiments described herein may be implemented by the processor itself. According to a software implementation, embodiments such as the procedures and functions described herein may be implemented with separate software modules. Each of the above-described software modules may perform one or more of the functions and operations described herein.

The computer instructions for performing the processing operations according to the various embodiments described above may be stored in a non-transitory computer-readable medium. The computer instructions stored in this non-transitory computer-readable medium may cause specific devices to perform processing operations according to the above-described various embodiments when executed by the processor of the specific device.

The non-transitory computer readable medium refers to a medium that stores data semi-permanently rather than storing data for a very short time, such as a register, a cache, a memory or etc., and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, or the like.

In addition, each of the elements (e.g., a module or a program) according to various embodiments may be comprised of a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in parallel, repetitively, or in a heuristically manner, or at least some operations may be performed in a different order, omitted, or may add a different operation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a memory storing information related to a relay device;
a first communication interface comprising circuitry;
a second communication interface comprising circuitry; and
a processor configured to:
control the first communication interface to communicate with the relay device,
control, based on a signal notifying communication connection failure between an external device and the relay device being received from the external device through the second communication interface, the second communication interface to transmit a signal requesting entry into a specific communication mode to the external device, wherein the signal notifying the communication connection failure comprises at least one of identification information of the external device or information related to a cause of the communication connection failure,
transmit, based on the external device being identified as entering the communication mode, information related to the stored relay device to the external device through the specific communication mode,
identify a device comprising a display from among at least one device registered to a same service account as the electronic device, and
transmit, to the identified device, a signal notifying the communication connection failure comprising information related to a cause of the communication connection failure based on the signal notifying the communication connection failure being received from the external device.

2. The electronic device of claim 1, further comprising:
a third communication interface,
wherein the processor is configured to control the third communication interface to communicatively connect with the external device which entered the specific communication mode.

3. The electronic device of claim 1, wherein the processor is furthered configured to control the second communication interface to communicatively connect with the external device which entered into the specific communication mode.

4. The electronic device of claim 1,
wherein the memory is configured to store identification information of at least one device registered to a same service account as the electronic device, and
wherein the processor is further configured to:

identify, based on a signal notifying the communication connection failure being received, whether identification information of the external device comprised in the signal matches with the stored identification information; and transmit, based on identification information of the external device being identified as matching with the stored identification information, a signal requesting entry into the specific communication mode to the external device.

5. The electronic device of claim 1, wherein information related to the relay device comprises at least one of service set identifier (SSID) information, password information, or address information of the relay device.

6. The electronic device of claim 1, further comprising:
a display,
wherein the processor is further configured to control, based on a signal notifying the communication connection failure being received, the display to display information related to a cause of the communication connection failure comprised in a signal notifying the communication connection failure.

7. The electronic device of claim 1,
wherein the signal notifying the communication connection failure and the signal requesting entry into the specific communication mode is broadcast through a Bluetooth Low Energy (BLE) communication method, and
wherein the communication mode is a Soft Access Point (AP) mode.

8. The electronic device of claim 1, wherein the external device is configured to:
perform, based on an address information of the relay device comprised in the information related to the relay device matching with an address information of a previously connected relay device, communication connection with the relay device; and
identify, based on an address information of the relay device comprised in the information related to the relay device not matching with an address information of the previously connected relay device, whether or not to perform communication connection with the relay device based on a signal intensity transmitted from the relay device.

9. The electronic device of claim 1, wherein the processor is further configured to provide, based on a signal notifying the communication connection failure being received from the external device, a message inquiring whether or not to communicatively connect between the relay device and the external device.

10. A control method of an electronic device storing information related to a relay device, the method comprising:
receiving, by a communication interface, a signal notifying communication connection failure between an external device and the relay device from the external device, wherein the communication interface comprises circuitry;
transmitting, by the communication interface, based on the signal notifying the communication connection failure being received, a signal requesting entry into a specific communication mode to the external device, wherein the signal notifying the communication connection failure comprises at least one of identification information of the external device or information related to a cause of the communication connection failure;

transmitting, by the communication interface, based on the external device being identified as entering the communication mode, information related to the stored relay device to the external device through the specified communication mode;
identifying a device comprising a display from among at least one device registered to a same service account as the electronic device; and
transmitting, to the identified device by the communication interface, a signal notifying the communication connection failure comprising information related to a cause of the communication connection failure based on the signal notifying the communication connection failure being received from the external device.

11. The method of claim 10,
wherein the electronic device is configured to store identification information of at least one device registered to a same service account as the electronic device, and
wherein the transmitting of the signal requesting entry into the specific communication mode comprises:
identifying, based on a signal notifying the communication connection failure being received, whether identification information of the external device comprised in the signal matches with the stored identification information, and
transmitting, based on identification information of the external device being identified as matching with the stored identification information, a signal requesting entry into the specified communication mode to the external device.

12. The method of claim 10, wherein the information related to the relay device comprises at least one of service set identifier (SSID) information, password information, or address information of the relay device.

13. The method of claim 10, further comprising:
displaying, based on a signal notifying the communication connection failure being received, information related to a cause of the communication connection failure comprised in a signal notifying the communication connection failure.

14. The method of claim 10,
wherein the signal notifying the communication connection failure and the signal requesting entry into the specific communication mode is broadcast through a Bluetooth Low Energy (BLE) communication method, and
wherein the communication mode is a Soft Access Point (AP) mode.

15. The method of claim 10, wherein the external device is configured to:
perform, based on an address information of the relay device comprised in the information related to the relay device matching with an address information of a previously connected relay device, communication connection with the relay device, and
identify, based on an address information of the relay device comprised in the information related to the relay device not matching with an address information of the previously connected relay device, whether or not to perform communication connection with the relay device based on a signal intensity transmitted from the relay device.

16. The method of claim 10, further comprising:
providing, based on a signal notifying the communication connection failure being received from the external device, a message inquiring whether to communicatively connect between the relay device and the external device.

\* \* \* \* \*